US009262868B2

(12) United States Patent
Turner (10) Patent No.: US 9,262,868 B2
(45) Date of Patent: Feb. 16, 2016

(54) METHOD FOR TRANSFORMING MAPPING DATA ASSOCIATED WITH DIFFERENT VIEW PLANES INTO AN ARBITRARY VIEW PLANE

(71) Applicant: GOOGLE INC., Mountain View, CA (US)

(72) Inventor: Kenneth James Turner, Greenslopes (AU)

(73) Assignee: Google Inc., Mountain View, CA (US)

( * ) Notice: Subject to any disclaimer, the term of this patent is extended or adjusted under 35 U.S.C. 154(b) by 134 days.

(21) Appl. No.: 13/623,035

(22) Filed: Sep. 19, 2012

(65) Prior Publication Data

US 2015/0178995 A1    Jun. 25, 2015

(51) Int. Cl.
*G06F 3/0481* (2013.01)
*G06T 19/20* (2011.01)
*G06T 17/05* (2011.01)

(52) U.S. Cl.
CPC ............ *G06T 19/20* (2013.01); *G06F 3/04815* (2013.01); *G06T 17/05* (2013.01)

(58) Field of Classification Search
CPC .................... G06F 3/0481; G06F 3/04815
USPC ......................................................... 715/781
See application file for complete search history.

(56) References Cited

U.S. PATENT DOCUMENTS

| | | | | |
|---|---|---|---|---|
| 5,638,523 | A * | 6/1997 | Mullet et al. | 715/855 |
| 6,198,852 | B1 * | 3/2001 | Anandan | G06K 9/209 345/419 |
| 6,346,938 | B1 * | 2/2002 | Chan et al. | 345/419 |
| 6,567,068 | B2 * | 5/2003 | Rekimoto | 345/156 |
| 2001/0022585 | A1 * | 9/2001 | Endo et al. | 345/427 |
| 2001/0043212 | A1 * | 11/2001 | Sone | G06T 15/20 345/427 |
| 2003/0154029 | A1 * | 8/2003 | Metrick | G01V 1/40 702/6 |
| 2003/0197660 | A1 * | 10/2003 | Takahashi | G08G 1/168 345/7 |
| 2004/0176908 | A1 * | 9/2004 | Senda et al. | 701/211 |
| 2006/0071930 | A1 * | 4/2006 | Fujiwara | G06T 15/08 345/419 |
| 2006/0244745 | A1 * | 11/2006 | Majer | G06F 3/04815 345/419 |
| 2006/0276200 | A1 * | 12/2006 | Radhakrishnan et al. | 455/456.1 |
| 2009/0254274 | A1 * | 10/2009 | Kulik | G01S 19/49 701/469 |
| 2010/0118116 | A1 * | 5/2010 | Tomasz | G01C 11/02 348/36 |
| 2010/0287199 | A1 * | 11/2010 | Fuhry et al. | 707/770 |
| 2011/0187723 | A1 * | 8/2011 | Chen | G06T 7/0022 345/473 |
| 2012/0069153 | A1 * | 3/2012 | Mochizuki et al. | 348/47 |
| 2012/0274642 | A1 * | 11/2012 | Ofek et al. | 345/441 |
| 2013/0057542 | A1 * | 3/2013 | Takenaka | G06T 3/0031 345/419 |
| 2013/0321431 | A1 * | 12/2013 | Chen et al. | 345/473 |
| 2013/0339891 | A1 * | 12/2013 | Blumenberg et al. | 715/771 |
| 2014/0340427 | A1 * | 11/2014 | Baker | 345/641 |

* cited by examiner

*Primary Examiner* — Reza Nabi
*Assistant Examiner* — Daniel Rodriguez
(74) *Attorney, Agent, or Firm* — Dority & Manning, P.A.

(57) ABSTRACT

A computer-implemented method for rendering mapping data is provided. The method includes obtaining mapping data for displaying a map image, wherein the mapping data comprises data of an image corresponding to a view plane, the view plane comprising an imaginary plane formed perpendicular to a direction of a viewer's line of sight. The method also includes projecting the obtained mapping data onto a reference view plane, identifying a user-selected view plane in which to display the map image, transforming the projected mapping data to correspond to the identified user-selected view plane, and generating the map image based on the transformed mapping data. Systems and machine-readable media are also provided.

17 Claims, 6 Drawing Sheets

METHOD FOR TRANSFORMING MAPPING DATA ASSOCIATED WITH DIFFERENT VIEW PLANES INTO AN ARBITRARY VIEW PLANE

BACKGROUND

Currently, mapping data which is used for displaying a map image may be formed of data for displaying the map image and various counterparts (e.g., another map image showing a different view or layers for overlaying on the map image) to the map image. The displayed map image and its various counterparts include images taken from multiple predetermined angles and/or directions.

SUMMARY

The subject technology relates to a computer-implemented method for transforming mapping data. The method includes obtaining mapping data for displaying a map image, wherein the mapping data comprises data of an image corresponding to a view plane, the view plane comprising an imaginary plane formed perpendicular to a direction of a viewer's line of sight. The method also includes projecting the obtained mapping data onto a reference view plane, identifying a user-selected view plane in which to display the map image, transforming the projected mapping data to correspond to the identified user-selected view plane, and generating the map image based on the transformed mapping data.

The subject technology further relates to a system for transforming mapping data. The system includes a memory storing executable instructions and a processor coupled to the memory configured to execute the stored executable instructions to obtain mapping data for displaying a map image, wherein the mapping data comprises data of an image corresponding to an initial view plane, the initial view plane associated with an elevation angle and an azimuth angle. The processor is also configured to execute instructions to project the obtained mapping data onto a reference view plane based on the elevation angle and the azimuth angle of the initial view plane, and identify a user-selected view plane in which to display the map image. The processor is further configured to execute instructions to transform the projected mapping data to correspond to the identified user-selected view plane, generate the map image based on the transformed mapping data, and provide the generated map image for display according to the identified user-selected view plane.

The disclosed technology also relates to a machine-readable storage medium comprising instructions stored therein, which when executed by processors, cause the processors to perform operations including obtaining mapping data for displaying a map image, wherein the mapping data comprises data of a plurality of images corresponding to a plurality of view planes, each of the plurality of view planes comprising an imaginary plane formed perpendicular to a direction of a viewer's line of sight. The operations also include projecting the obtained mapping data onto a reference view plane, based on a two-dimensional transformation matrix, wherein the reference view plane has an elevation angle of zero degrees and an azimuth angle of zero degrees. The operations further include identifying a user-selected view plane in which to display the map image, and transforming the projected mapping data to correspond to the identified user-selected view plane, based on at least a two-dimensional orthographic projection. The operations yet further include generating the map image based on the transformed mapping data, and providing the generated map image for display according to the identified user-selected view plane.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Mapping data which is used for displaying a map image in a computer application (e.g., a web browser) may be formed of data for displaying the map image and various counterparts (e.g., another map image showing a different view or layers for overlaying on the map image) of the map image. The displayed electronic map image and its various counterparts include images taken from multiple predetermined angles and/or directions. When a map image is displayed to a user, the user may wish to transition the map image from the angle and/or direction that the image is taken, to a user-selected angle and/or direction. In doing so, the user may also wish to transform the angle and/or the direction of all the counterparts into the user-selected angle and/or direction.

The disclosed subject technology provides a method and system for transforming mapping data associated with different view planes into an arbitrary view plane. A view plane refers to an imaginary plane formed perpendicular to a direction of a viewer's (or an image taker's) line of sight. A view plane may be associated with two types of properties: elevation angle and azimuth angle. The elevation angle, as used herein, refers to the angle the view plane makes with reference to the horizontal plane (e.g., a plane corresponding to the earth's surface). An elevation angle of zero degrees corresponds to the horizontal plane. The azimuth angle, as used herein, refers to the degree of rotation the view plane makes with respect to a reference direction on the horizontal plane. The reference direction may be, for example, a cardinal direction (e.g., North, South, East, West or other directions).

Figure 6A:
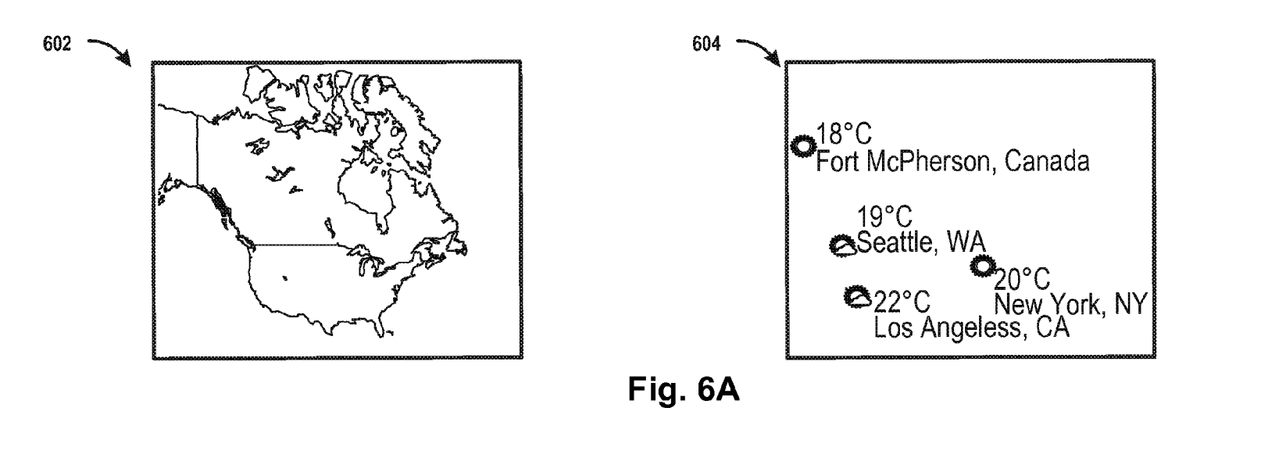
FIG. 6A illustrates an example map image and an example counterpart image.

Mapping data for displaying a map image in a computer application (e.g., a web browser) may include data for displaying the map image. The mapping data may also include data for displaying one or more counterpart images that correspond to the map image. The map image may be, for example, an image of a map of a specific geographic area. The counterpart images may be, for example, another map image showing a different view of the same geographic area, or an additional image layer that may be overlaid on top of the map image providing additional information, such as, for example, traffic density, weather, schematics for power grids, underground pipelines, public transit routes, or other types of two-dimensional vector or raster data. FIG. 6A illustrates an example map image 602 and an example counterpart image 604. Map image 602 is an image of a map of North America. Counterpart image 604 is an image layer that may be overlaid on top of the map image 602, and provides weather information for North America.

Figure 6B:
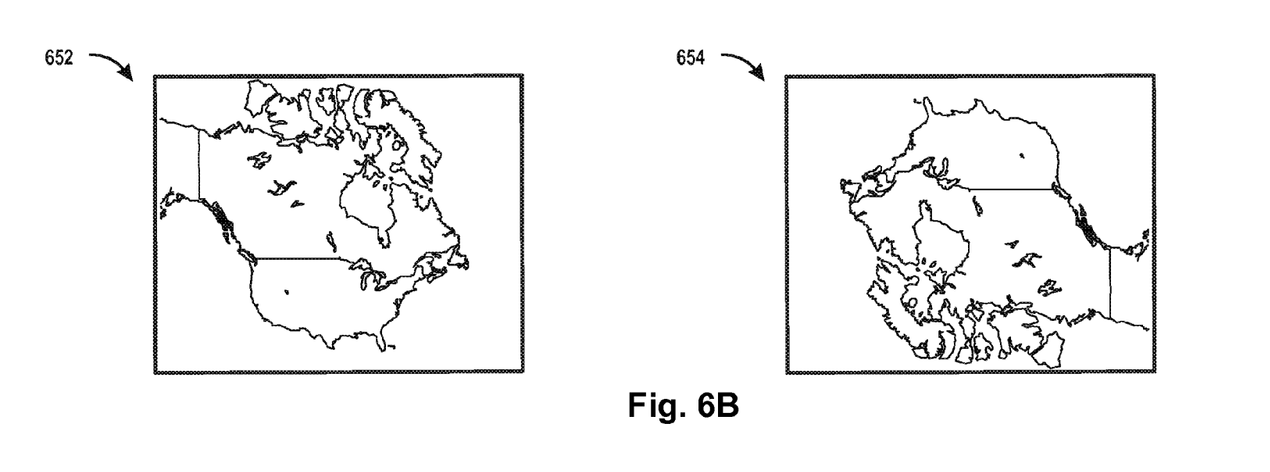
FIG. 6B illustrates examples of map images that are associated with different view planes.

Some or all of the map image and any counterpart images may be associated with different view planes. Examples of the different view planes may be a "top down" view plane that is looking straight down, perpendicularly to the ground (e.g., a satellite image or a 90-degree elevation angle), a view plane looking down to the ground at an angle (e.g., an aerial photography image, which may look down to the ground, for example, at a 45-degree elevation angle) or a view plane looking in a specific cardinal direction (e.g., North/0-degree azimuth angle, or South/180-degree azimuth angle). FIG. 6B illustrates examples of map images that are associated with different view planes. Map image 652, which is identical to map image 602, is associated with a "top down" view plane (90-degree elevation angle). Map image 654 is associated with a view plane that is looking in the South (180-degree azimuth angle) cardinal direction.

In order to transform a map image and its counterpart images from each of their originally-associated view planes to a user-selected arbitrary view plane, a reference view plane is established. Also, a two-dimensional (2D) transformation is made to project the map image and its counterpart images onto the established reference view plane. The established reference view plane may be, for example, the horizontal plane (plane corresponding to the earth's surface). When performing the 2D transformation to project a map image and its counterpart images onto the reference view plane, the coordinates of the map image and its counterpart images are transformed into the coordinates of the reference view plane. The coordinates of the map image and its counterpart images are transformed into the coordinates of the reference view plane based on the differences in the elevation and azimuth angles between the reference view plane and the respective view plane associated with the map image and its counterparts. The result is that the map image and its counterpart images are scaled, skewed, or rotated according to the differences in the elevation and azimuth angles. The coordinates of the map image and its counterparts may be, for example, Cartesian coordinates (x-y coordinates), and the coordinates of the reference view plane may be, for example, longitudes and latitudes. If a map image or a counterpart image is already associated with the reference view plane, the projection onto the reference plane may be skipped for such map image or such counterpart image, in order to reduce the number of calculations and to improve efficiency.

After the map image and each of its counterpart images are projected onto the reference view plane, a user-selected view plane into which the map image and its counterpart images are to be transformed, is identified. The user-selected view plane may be identified, for example, based on a user input. The map image and each of its counterpart images that are projected onto the reference view plane are transformed such that the map image and its counterpart images are displayed from the perspective of the user-selected view plane. The transformation from the reference view plane to the user-selected view plane may be performed using a 2D orthographic projection. A 2D orthographic projection may include performing a pure orthographic projection onto a view plane looking along one of predefined major axes (e.g., 0-degree elevation angle, 90-degree elevation angle, North azimuth angle, South azimuth angle, East azimuth angle, West azimuth angle, or any combination of the foregoing elevation and azimuth angles), and performing a 2D transformation from the view plane of major axis to the user-selected view plane.

When 2D transformation or projection techniques are used, calculations for performing the projections and transformations are simplified. Thus, a smooth transition between different view planes may be achieved without utilizing three-dimensional (3D) hardware capabilities. Because 3D hardware capabilities are not required, the subject technology may be performed on a wide variety of computer applications and devices, including web browsers operating on mobile devices (e.g., smart phones).

Figure 1:
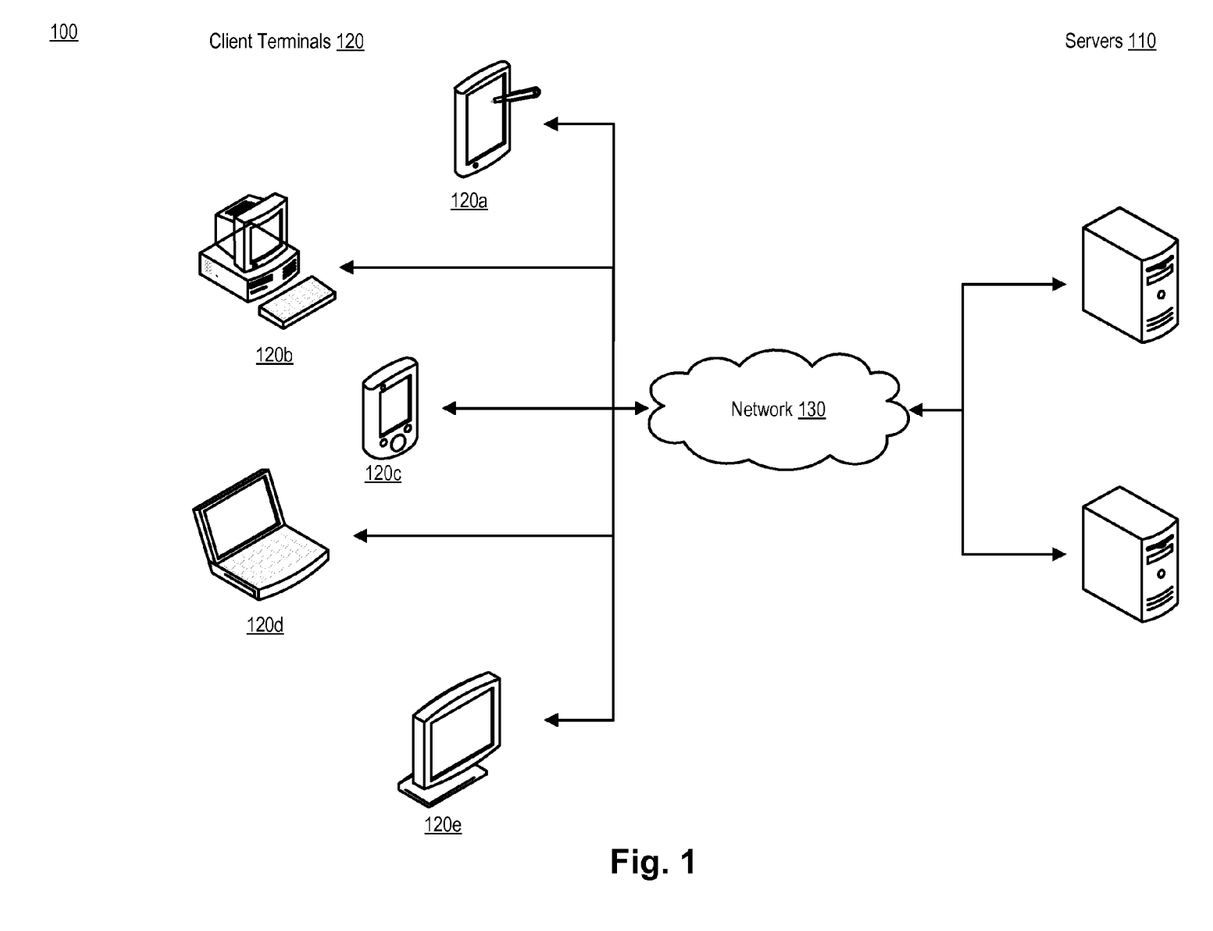
FIG. 1 illustrates an example system for transforming mapping data associated with different view planes into an arbitrary view plane.

FIG. 1 illustrates an example system 100 for transforming mapping data associated with different view planes into an arbitrary view plane. The system 100 includes servers 110 and client terminals 120 connected over a network 130. Each of the client terminals 120 may interact with users and communicate with the servers 110 to transform mapping data associated with different view planes into an arbitrary view plane. The client terminals 120 may be, for example, mobile devices such as tablet computers 120a, desktop computers 120b, smart phones 120c, laptop computers 120d or navigation systems 120e that are capable of running computer applications (e.g., web browser or mobile applications) for accessing the Internet. The client terminals 120 may, for example, receive a selection of a desired view plane from a user and transform mapping data associated with an arbitrary view plane into the user-selected view plane.

The servers 110 may be any device having a processor, memory, and communications capability for communicating with the client terminals 120 to exchange data for transforming mapping data associated with different view planes into an arbitrary view plane. The servers 110 may be a single server, or may be two or more servers communicating with each other to provide the functionalities for transforming mapping data associated with different view planes into an arbitrary view plane. For example, the servers 110 may be multiple servers arranged in a cloud computing configuration. The servers 110 may, for example, receive a request for mapping data for display at a client terminal 120 and send the requested mapping data to the client terminal 120.

The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 130 may include, but is not limited to, any one or more of the following network topologies, including a bus network, a star network, a ring network, a mesh network, a star-bus network, tree or hierarchical network, and the like.

Figure 2:
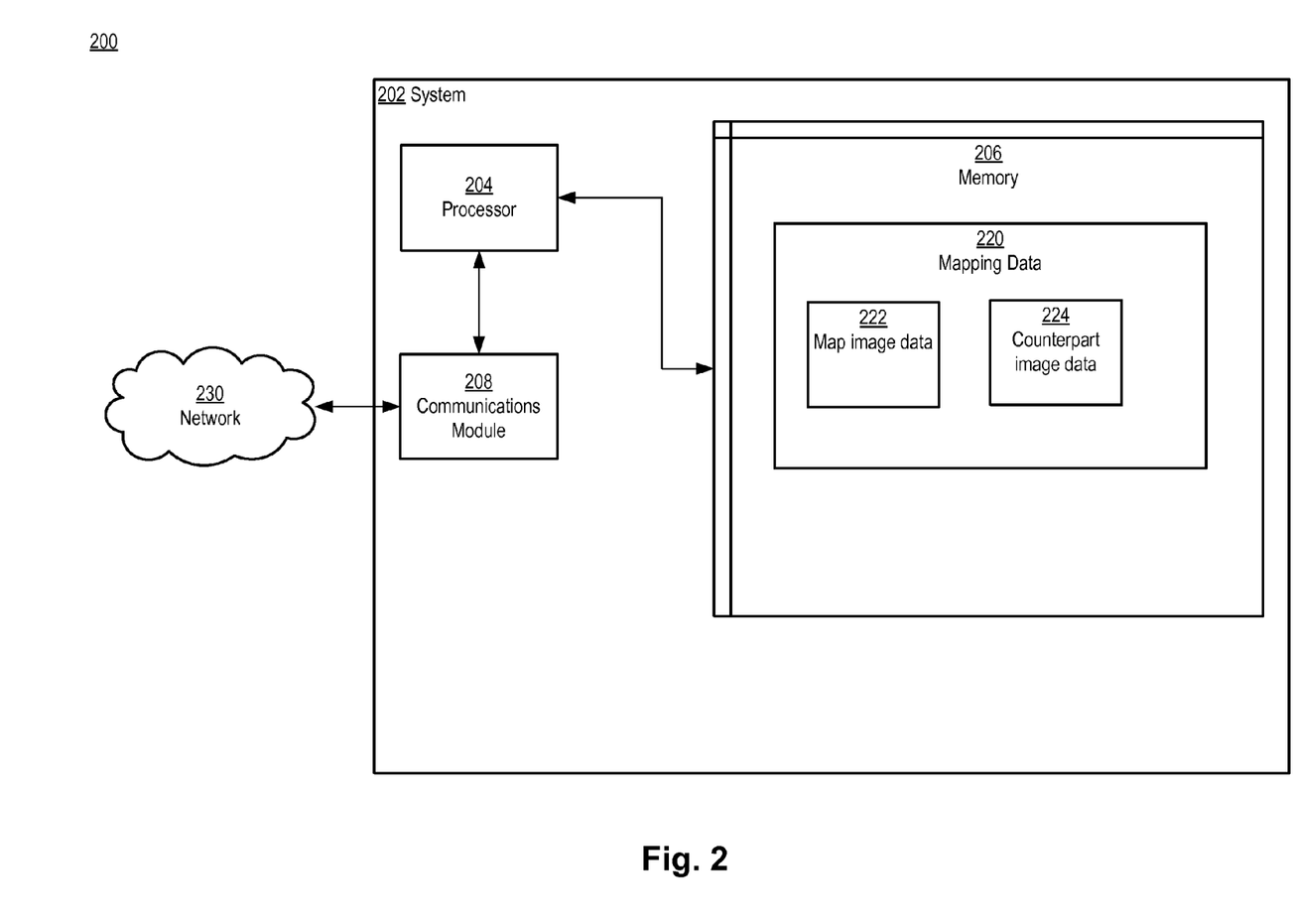
FIG. 2 is a block diagram illustrating an example system for transforming mapping data associated with different view planes into an arbitrary view plane.

FIG. 2 is a block diagram 200 illustrating an example system 202 for transforming mapping data associated with different view planes into an arbitrary view plane. The system 202 may be implemented, for example, at one of the client terminals 120a-120e, at one of servers 110, or spread across servers 110 and client terminals 120a-120e. The system 202 includes a processor 204 and a memory 206. The system 202 also includes a communications module 208, and is connected to a network 230 via the communications module 208. The network 230 may be, for example, the network 130. The communications module 208 is configured to interface with the network 230 to send and receive information, such as data, requests, responses, and commands to other devices (e.g., servers 110 or client terminals 120a-120e) or systems on the network 230. The communications module 208 may be, for example, modems, Ethernet cards or mobile broadband adaptors.

The memory 206 includes mapping data 220 that may be used for displaying a map image to the user. The map image may be, for example, an image of a map of specific geographic area. The mapping data 220 includes map image data 222 and counterpart image data 224. The map image data 222 is used for displaying the map image. The counterpart image data 224 is used for displaying one or more counterpart images that may be associated with the map image. The counterpart images may include, for example, an image showing a different view of the same geographic area of the map image. The counterpart images may also include a layer that may be overlaid on top of the map image, providing additional information such as, for example, traffic density, weather, schematics for power grids, underground pipelines, or public transit routes. The counterpart images may also include other types of images or information that is stored as two-dimensional vectors or raster data (e.g., a bitmap image). The memory 206 may also be implemented to be independent from the system 202 and in communication with the system.

The processor 204 is configured to execute instructions, such as instructions physically coded into the processor, instructions received in the form of software from the memory 206, or a combination of both. For example, the processor 204 is configured to execute instructions to obtain mapping data (e.g., mapping data 220) for displaying a map image. The mapping data includes data (e.g., map image data 222) of an image that corresponds to a view plane. The view plane may be a plane that is perpendicular to a line of sight of a user. The processor 204 is also configured to execute instructions to project the obtained mapping data onto a horizontal view plane. The horizontal view plane may be a plane corresponding to the earth's surface. The processor 204 is further configured to identify a user-selected view plane in which to display the map image, transform the projected mapping data to correspond to the identified user-selected view plane, and generate the map image based on the transformed mapping data.

Figure 3:
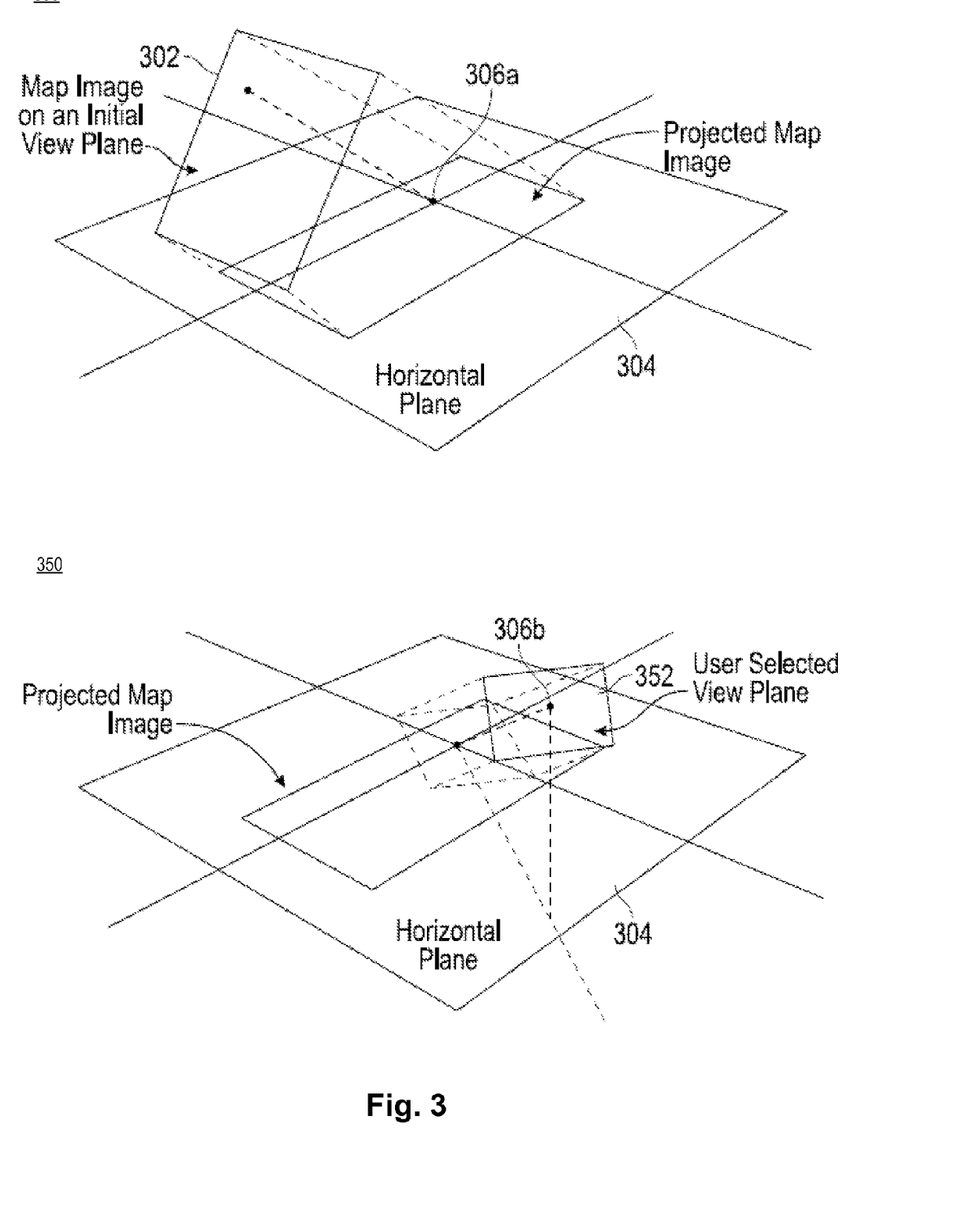
FIG. 3 shows diagrams illustrating example operations for transforming mapping data associated with different view planes into an arbitrary view plane.

FIG. 3 shows diagrams 300 and 350 illustrating example operations for transforming mapping data associated with different view planes into an arbitrary view plane. The operations may be performed by, for example, the system 202. A map image may be displayed to a user in a computer application (e.g., web browsers, mobile applications). The map image may be, for example, an image of a map of the United States. The map image may also include one or more counterpart images associated with the image of the map of the United States. For example, the map image may have an image of the U.S. national power grid system overlaid on top of the image of the map of the United States. The displayed map image may be associated with a certain view plane. Diagram 300 shows that a map image that is initially displayed in a web browser is associated with an initial view plane 302 having an elevation angle of 45 degrees (line of sight associated with the view plane is at a 45-degree angle with a reference view plane) with an azimuth angle of 0 degrees (the top of the displayed map image from the user's point of view is North). From the map image displayed in such initial view plane, the user may select a new view plane in which he or she wishes to view the map image. For example, the user may select the view plane 352 with an elevation angle of 60 degrees and an azimuth angle of 110 degrees, as the new view plane in which to view the map image.

To transform the map image from the initial view plane to the user-selected view plane, the mapping data (e.g., mapping data 220) for displaying the map image is projected onto a reference view plane 304. The reference view plane 304 may be any view plane having any elevation angle or any azimuth angle. The reference view plane may be, for example, the horizontal view plane. The horizontal view plane corresponds to the earth's surface (e.g., elevation angle is zero degrees) and has an azimuth angle of zero degrees. Other view planes may also be used as the reference view plane.

As discussed above, the mapping data includes data for displaying the map image (e.g., map image data 222), and may also include data for displaying one or more counterpart images (counterpart image data 224) that are associated with the map image. Therefore, when the mapping data is projected onto the reference view plane, in addition to data for the map image, data for the counterpart images that are associated with the map image is also projected. The projection is performed by transforming the mapping data (including the map image data and the counterpart image data) such that the coordinates of the map image and the counterpart images are transformed from the coordinates of the initial view plane 302 into the coordinates of the reference view plane 304. The coordinates are transformed based on the differences in the elevation and azimuth angles between the reference view plane 304 and the initial view plane 302.

The coordinate units of the map and any counterpart images in the initial view plane 302 may be, for example, in Cartesian coordinates (x-y coordinates). However, when the mapping data is projected onto the reference view plane 304, the coordinate units may be converted into, for example, longitude and latitude coordinates. Further, the counterpart images that may be associated with the map image, may be associated with view planes that are different from the initial view plane 302. Therefore, different instances of projections may be performed for each of the counterpart images to project the counterpart images onto the reference view plane 304. In order to align such projected counterpart images with the projected map image on the reference view plane 304, a reference point 306a may be selected as a point of alignment. If any of the map image or its counterpart images are already associated with the reference view plane 304, the projection onto the reference plane may be skipped for such map image or counterpart image, in order to reduce the number of calculations and improve efficiency.

In an aspect of the subject technology, the projection onto the reference view plane 304 may be performed using a 2D transformation matrix. The 2D transformation matrix may be constructed from the map image data and the counterpart image data. The 2D transformation matrix may have a rotation component and a scaling component for projecting the map image and the counterpart images onto the reference view plane 304. The rotation and scaling components may be calculated using the differences in the azimuth angles and the elevation angles between the initial view plane 302 and the reference view plane 304. The calculations for the transformation may be performed using the constructed transformation matrix with reference to the reference point 306a.

The map image and the counterpart images that are projected onto the reference view plane 304 are transformed such that the map image and the counterpart images are displayed from the perspective of the user-selected view plane 352. The coordinates of the map image and its counterpart images that are projected onto the reference view plane 304, are transformed into the coordinates of the user-selected view plane 352. The transformation into the user-selected view plane 352 is made by taking into account the elevation angle and the azimuth angle of the user-selected view plane. The transformation may be performed, for example, using a 2D orthographic projection. Also, the coordinate units may be converted back into the Cartesian coordinates. A reference point 306b may be selected on the user-selected view plane 352 for use as an alignment point to align the transformed map image and the transformed counterpart images on the user-selected view plane.

Figure 4:
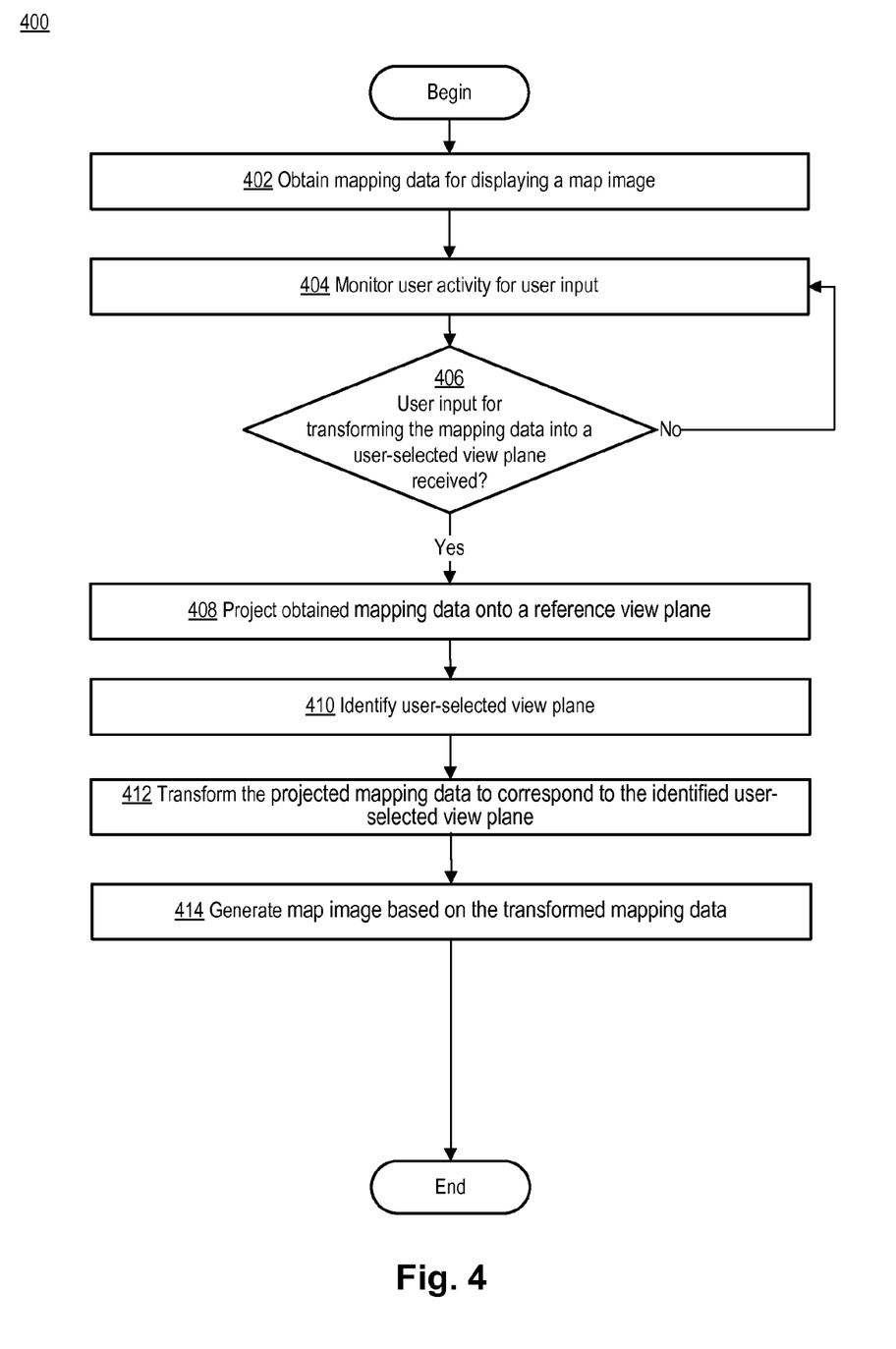
FIG. 4 illustrates a flow diagram of an example process for transforming mapping data associated with different view planes into an arbitrary view plane.

FIG. 4 illustrates a flow diagram of an example process 400 for transforming mapping data associated with different view planes into an arbitrary view plane. The processes of FIG. 4 may be performed by, for example, system 202. However, the operations of FIG. 4 are not limited to such a system, and may be performed using other systems/configurations.

Process 400 begins at block 402 where mapping data (e.g., mapping data 220) for displaying a map image is obtained. The mapping data may be obtained, for example, from a mapping server (e.g., a server 110) which stores the mapping data. The mapping data may also be obtained from a data store (e.g., data store 210) of a client terminal (e.g., a client terminal 120). The mapping data may include data (e.g., map image data 222) of an image corresponding to a view plane. The map image may be an image of a map corresponding to a geographic area. The mapping data may also include another type of data (e.g., counterpart image data 224) of counterpart images that correspond to the map image. The counterpart images may include, for example, another map image showing a different view of the same geographic area, or an additional image layer that may be overlaid on top of the map image providing additional information, such as, for example, traffic density, weather, schematics for power grids, underground pipelines, or public transit routes. The view plane has a corresponding line of sight that is perpendicular to the view plane. At block 404, user activity is monitored for input that is received from a user. At block 406, a determination is made as to whether a user input for transforming the mapping data into a user-selected view plane is received.

When the user input for transforming the mapping data into a user-selected view plane is received, at block 408, the obtained mapping data is projected onto a reference view plane. The projection onto the reference view plane may be performed using a 2D transformation matrix. The 2D transformation matrix may be constructed from the obtained mapping data. The reference view plane may be, for example, a horizontal view plane having an elevation angle of zero degrees and an azimuth angle of zero degrees. If no user input is received for transforming the mapping data into a user-selected view plane, the process reverts back to block 404.

At block 410, a user-selected view plane in which to display the map image is identified. The user-selected view plane may be identified from the user input that is determined to be received at block 406. At block 412, the projected mapping data is transformed to correspond to the identified user-selected view plane. For example, the projected mapping data is transformed such that coordinates of the map image (for which the mapping data is used for displaying) is transformed into the coordinates of the user-selected view plane. The transformation of the coordinates into the user-selected view plane may be performed by taking into account the elevation angle and the azimuth angle of the user-selected view plane. Specifically, the transformation may be performed using a 2D orthographic projection. At block 414, the map image is generated based on the mapping data that is transformed at block 412. Specifically, using the mapping data that is transformed at block 412, the map image is generated such that the map image may be displayed from the perspective of the user-selected view plane. The generated map image may also include counterpart images that correspond to the map image.

Figure 5:
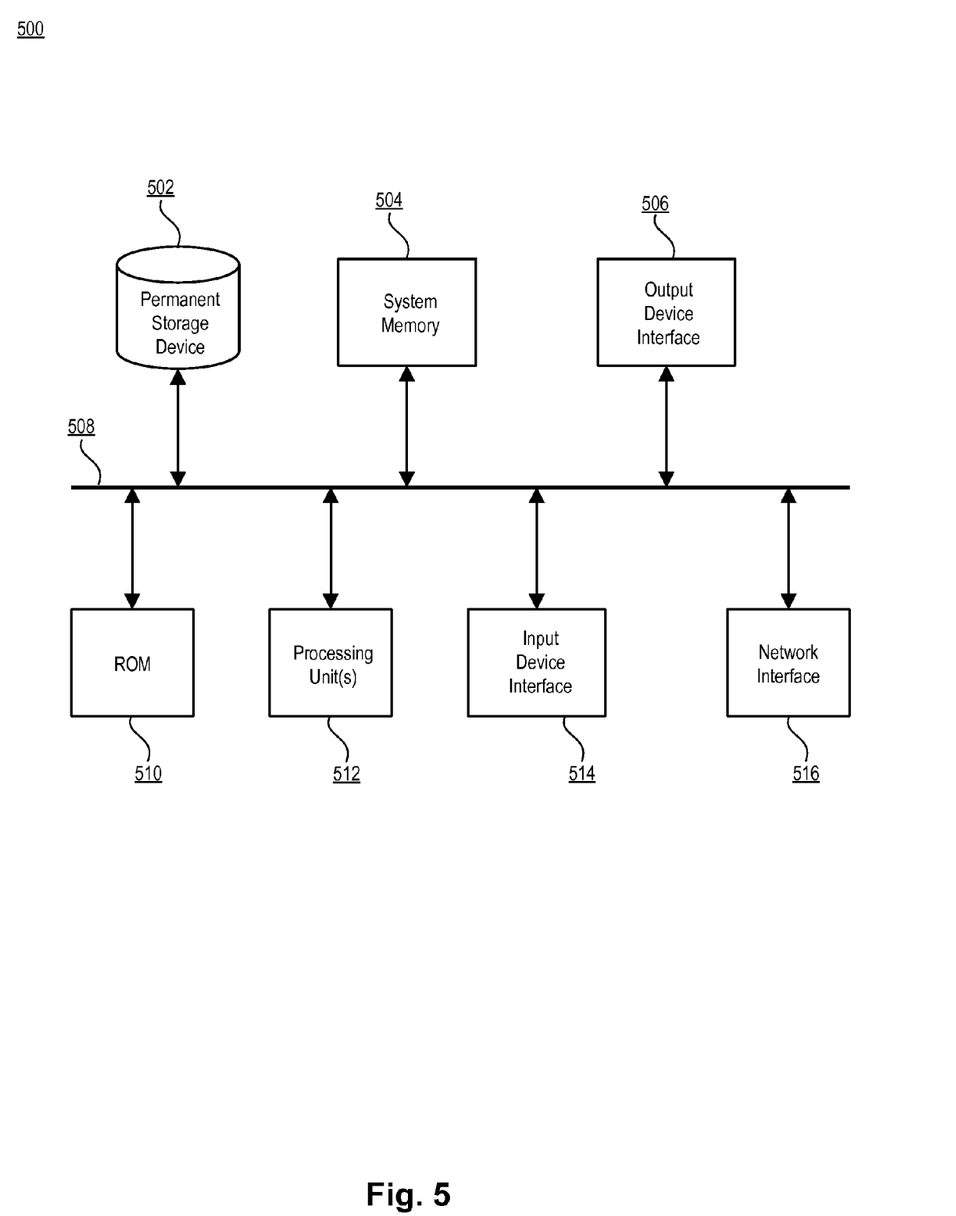
FIG. 5 conceptually illustrates an electronic system with which any implementations of the subject technology are implemented.

FIG. 5 conceptually illustrates electronic system 500 with which any implementations of the subject technology are implemented. Electronic system 500, for example, can be a desktop computer, a laptop computer, a tablet computer, a server, a switch, a router, a base station, a receiver, a phone, a personal digital assistant (PDA), any device that transforms mapping data, or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as televisions or other displays with one or more processors coupled thereto or embedded therein, or other appropriate computing devices that can be used for running an application. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Terms such as "top," "bottom," "front," "rear" and the like as used in this disclosure, if any, should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for transforming mapping data, the method comprising:
    obtaining, by one or more computing devices, mapping data for displaying a map image, wherein the mapping data comprises data associated with a first image corresponding to a first view plane and data associated with one or more counterpart images corresponding to a second view plane, the first view plane comprising an imaginary plane formed perpendicular to a direction of a viewer's line of sight, and the second view plane being different from the first view plane;
    receiving, by the one or more computing devices, a user input indicative of a user-selected view plane in which to display the map image, the user-selected view plane specifying a change in an azimuth angle and an elevation angle from the first view plane;
    responsive to receiving the user input indicative of the user-selected view plane, projecting, by the one or more computing devices, the obtained mapping data onto a reference view plane, the reference view plane being different from the first view plane and the second view plane;
    responsive to projecting the obtained mapping data onto the reference view plane, transforming, by the one or more computing devices, the projected mapping data to correspond to the user-selected view plane; and
    generating, by the one or more computing devices, the map image for viewing from a perspective of the user-selected view plane based on the transformed mapping data.

2. The computer-implemented method of claim 1, further comprising providing the generated map image for display from the perspective of the user-selected view plane.

3. The computer-implemented method of claim 1, wherein projecting the obtained mapping data includes scaling, skewing, or rotating the obtained mapping data onto the reference view plane.

4. The computer-implemented method of claim 1, wherein the one or more counterpart images include images indicating public transit routes.

5. The computer-implemented method of claim 1, wherein the data associated with the one or more counterpart images comprise two-dimensional vector or raster data.

6. The computer-implemented method of claim 1, wherein the reference view plane is a horizontal view plane having an elevation angle of zero degrees and an azimuth angle of zero degrees.

7. The computer-implemented method of claim 1, wherein the step of projecting is performed based on a two-dimensional transformation matrix.

8. The computer-implemented method of claim 1, wherein the step of transforming is performed based on at least a two-dimensional orthographic projection.

9. A system for transforming mapping data, the system comprising:
a memory storing executable instructions; and
a processor coupled to the memory configured to execute the stored executable instructions to:
obtain mapping data for displaying a map image, wherein the mapping data comprises data of a first image corresponding to a first view plane and data of one or more counterpart images corresponding to a second view plane, the first view plane associated with a first elevation angle and a first azimuth angle, and the second view plane associated with a second elevation angle and a second azimuth angle;
receive a user input indicative of a user-selected view plane in which to display the map image, the user-selected view plane corresponding to a third elevation angle and a third azimuth angle;
responsive to receiving the user input indicative of the user-selected view plane, project the obtained mapping data onto a reference view plane based at least in part on the first elevation angle and the first azimuth angle of the initial view plane, the reference view plane being different from the first and second view planes;
responsive to projecting the obtained mapping data onto the reference view plane, transform the projected mapping data to correspond to the user-selected view plane;
generate the map image for viewing from a perspective of the user-selected view plane based on the transformed mapping data; and
provide the generated map image for display from the perspective of the user-selected view plane.

10. The system of claim 9, wherein projecting the obtained mapping data includes scaling, skewing, or rotating the obtained mapping data onto the reference plane.

11. The system of claim 9, wherein the one or more counterpart images include images indicating traffic density.

12. The system of claim 9, wherein the data of the one or more counterpart images comprise two-dimensional vector or raster data.

13. The system of claim 9, wherein the reference view plane is a horizontal view plane having an elevation angle of zero degrees and an azimuth angle of zero degrees.

14. The system of claim 9, wherein projecting the obtained mapping data is performed based on a two-dimensional transformation matrix.

15. The system of claim 9, wherein transforming the projected mapping data is performed based on at least a two-dimensional orthographic projection.

16. A non-transitory machine-readable storage medium comprising instructions stored therein, which when executed by processors, cause the processors to perform operations comprising:
obtaining mapping data for displaying a map image, wherein the mapping data comprises data of a plurality of images corresponding to a plurality of view planes, each of the plurality of view planes comprising a different imaginary plane formed perpendicular to a direction of a viewer's line of sight;
receiving a user input indicative of a user-selected view plane in in which to display the map image, the user-selected view plane specifying a change in azimuth angle and elevation angle from at least one of the plurality of view planes;
responsive to receiving the user input indicative of the user-selected view plane, projecting the obtained mapping data onto a reference view plane, based on a two-dimensional transformation matrix, wherein the reference view plane has an elevation angle of zero degrees and an azimuth angle of zero degrees;
responsive to projecting the obtained mapping data onto the reference view plane, transforming the projected mapping data to correspond to the user-selected view plane, based on at least a two-dimensional orthographic projection;
generating the map image for viewing from a perspective of the user-selected view plane based on the transformed mapping data; and
providing the generated map image for display from the perspective of the user-selected view plane.

17. The non-transitory machine-readable storage medium of claim 16, wherein the data of the plurality of images comprise two-dimensional vector or raster data.

* * * * *